United States Patent Office 2,753,314
Patented July 3, 1956

2,753,314

COMPOSITION COMPRISING A GELLING AGENT AND A DISPERSION OF A VINYL RESIN IN A PLASTICIZER

Edward T. Severs, Mount Lebanon, and Arthur C. Frechtling, Allison Park, Pa., assignors to Union Carbide and Carbon Corporation, a corporation of New York No Drawing. Application December 13, 1952,
Serial No. 325,882

20 Claims. (Cl. 260—23)

This invention relates to a new composition of matter comprising a vinyl resin, a plasticizer, and a gelling agent. The system may also include pigments or other coloring agents and fillers.

One object of this invention is to provide a plastic composition which can be formed or shaped into free-standing or self-sustaining objects or articles which retain their shape and detail during fusion to the solid state.

Another object is to provide a plastic composition having thixotropic properties which make it possible to mix compositions of high ultimate consistency with less powerful mixing equipment.

Still another object is to provide a plastic composition which can be molded, extruded, stamped or otherwise worked at room temperature using low-pressure equipment.

Other objects and advantages of the invention will be apparent from the description which follows.

It has been discovered that when a vinyl resin, a plasticizer, and a suitable gelling agent are mixed together, the resulting composition is a self-sustaining mass which can be shaped as desired, and which retains its shape after fusion to the solid state. This composition is referred to for convenience as a plastigel herein. Plastigels are unique in their high shear resistance and shape retaining properties. They can be molded and shaped as desired and will retain their shape during fusion even though fused after removal from the mold or other forming device. As will be shown in the example, the shaped plastigels retain even minute surface details while being fused. This property is of important commercial advantage as will be shown.

Freshly prepared plastigels are more mobile than those which have aged undisturbed for about 24 hours. This is an advantage since less power is required to mix plastigels of high ultimate consistency, it being possible to mix them when freshly prepared and then let them age to high consistency for use. This change in consistency is thixotropic (the property of becoming fluid when shaken and then regelling upon standing) in nature. Hence, the mobility may be regained by subsequent agitation. Prolonged kneading of unfused plastigels causes them to become softer and more readily worked, but upon standing they return nearly to the original degree of stiffness. This is further evidence of the thixotropic properties of plastigels. When this composition is then baked at 350°—400° F., fusion occurs and objects of varying degrees of hardness, depending upon the proportions used in the mixture, are produced.

The resins of this invention are vinyl chloride polymer resins. Polyvinyl chloride alone is suitable as also are a number of copolymers of vinyl chloride with other polymerizable materials such as vinyl acetate, vinyl propionate, methyl acrylate, butyl acrylate, methyl methacrylate, butyl methacrylate, acrylonitrile, vinylidine chloride and maleate esters, such as dibutyl maleate. It is desirable that the vinyl chloride resins be of high molecular weight, as determined by their relative insolubility in certain solvents, such as toluene and butyl acetate. Most of the resins, however, are soluble in cyclic and unsaturated ketones, such as mesityl oxide, isophorone and cyclohexanone. In making the copolymers, vinyl chloride is usually employed in predominant amounts.

To obtain proper dispersion of the resin in the plasticizer, it is essential to use finely divided resins. It is preferable, therefore, to employ a vinyl chloride resin which is made by the polymerization of the monomeric materials in aqueous emulsion, according to known procedures, for instance, by polymerization at low temperatures of 35° to 40° as disclosed in United States Patent No. 2,068,424. The resin particles produced by emulsion polymerization are extremely minute, and the agglomerates produced by coagulation of the resinous suspensions formed by polymerization of the monomeric materials in aqueous emulsion retain the ability to be subdivided.

One resin which has proved suitable for the invention is an emulsion polymerized polyvinyl chloride resin containing 99+ per cent of vinyl chloride and having a specific viscosity of 0.30. This resin has been shown by electron microphotographs to consist essentially of discrete spherical particles and it may be dispersed in a suitable liquid by stirring. Another resin which has proved suitable for use in the invention is an emulsion polymerized vinyl chloride-vinyl acetate copolymer containing 96 per cent vinyl chloride and having a specific viscosity of 0.29. This resin contains agglomerated spherical particles and therefore attrition by milling in a suitable liquid is usually employed to break down the agglomerates and form a good dispersion. Mixtures of these two resins have also been used successfully. The particle size of the latter resin is smaller than that of the former, and less dispersing liquid can be used in a mixture.

As stated above, the primary resin of the invention is an emulsion polymerized vinyl chloride polymer resin which is dispersed in the plasticizer because it is insoluble in the plasticizer except at high temperatures. However, relatively small quantities, up to five parts by weight per 100 parts primary resin, of a second resin of a type readily soluble in the plasticizer can be added for the purpose of increasing the tensile strength of the shaped object. A resin typical of this class is a solution polymerized vinyl chloride-vinyl acetate copolymer resin consisting of 90 per cent vinyl chloride and having an intrinsic viscosity of 0.79. Another suitable resin is butyl methacrylate. Such a resin is first dissolved in a portion of the plasticizer before being introduced into the plastigel system. Example VI illustrates the superior strength characteristics achieved by the inclusion of such a resin in the plastigel mixture.

To make a plastigel, the emulsion polymerized vinyl chloride polymer resin is dispersed in a liquid plasticizer and a gelling agent is added. The proportion of plasticizer to resin can be varied considerably, dependent on several factors. Molding compositions have been prepared which range in plasticizer content from 35 parts of plasticizer per hundred parts resin by weight to 300 parts of plasticizer per hundred parts of resin by weight. A low plasticizer content produces a hard final product having a Shore A Durometer hardness of approximately 95, while a high plasticizer content results in softer final products having a Shore A Durometer hardness of approximately 15. The preferred range of plasticizer concentration is from 60 to 100 parts of plasticizer by weight per one hundred parts of resin.

The plasticizer can be chosen primarily for its effect on the physical properties of the fused plastigel as finally produced. Volatility, electrical properties, resistance to migration and marring of surfaces, low temperature flexibility, effect on light and heat stability of the resin and color are some of the properties considered. Plasticizers suitable for this invention are in general high boiling point organic liquids.

Di(2-ethylhexyl)phthalate is a good general purpose plasticizer. Di(2-ethylhexyl)hexahydrophthalate produces plastigels with properties approaching those obtained by using di(2-ethylhexyl)phthalate, and such plastigels have better storage stability in the unfused state. Tri(2-ethylhexyl)phosphate and di(2-ethylhexyl)adipate are good for producing plastigels having low temperature flexibility. Tricresyl phosphate produces plastigels with good chemical resistance and electrical properties, and low volatility. For a particular plasticizer or mixture of plasticizers, the concentration is dependent upon the degree of hardness desired in the fused plastigel.

The third major element of the invention is the gelling agent, which is added to the first two, the resin and plasticizer, slowly and with stirring until a sufficient quantity has been introduced to give the desired consistency to the plastigel for molding extrusion or whatever shaping operation is to be performed on it prior to fusion. Suitable gelling agents have been discovered among the organophilic substances. The amine adduct of bentonite and silica aerogel are particularly effective. Several others have been found suitable within narrower ranges.

By aminated bentonite we mean bentonite refined from Wyoming montmorillonite and in which the sodium ions have been exchanged with organic bases or their salts or quaternary amine compounds, such bases including amines having 10, 12, 18 or up to 34 or more carbon atoms per nitrogen atom. The addition of an amine having such long alkyl groups converts normally hydrophilic characteristics of bentonite to organophilic. This reaction is more fully described in United States Patent No. 2,531,440.

Aminated bentonite has been found effective in ranges of from 2 to 10 parts by weight per one hundred parts of resin, using 60 parts by weight of di(2-ethylhexyl)-phthalate plasticizer per one hundred parts of resin. Over 10 parts of aminated bentonite per hundred parts of resin produces molding compositions which are too friable and crumbly for hand molding, using 60 parts by weight of plasticizer per hundred parts or resin. The preferred range is from 4 to 6 parts of aminated bentonite per hundred parts resin with 60 parts by weight of plasticizer per hundred parts of resin. In general, higher concentrations of plasticizer require higher concentrations of aminated bentonite and lower plasticizer concentrations require less aminated bentonite. Using from 60 to 100 parts by weight of plasticizer per hundred parts of resin, the preferred range of aminated bentonite content is from 4 to 10 parts per hundred parts resin. With from 35 to 300 parts of plasticizer by weight per hundred parts of resin, the range of the aminated bentonite content is from 2 to 50 parts per hundred parts of resin.

Ordinarily, the gelling agent is added to the plasticizer resin combination. However, the results of Example III indicate that premilling the aminated bentonite with part of the plasticizer to form a grease-like mixture and then adding this "grease" to the resin and the rest of the plasticizer increases the efficiency of the aminated bentonite in promoting rigidity in the molding composition. It also shows that adding the aminated bentonite dry to the resin and then adding the two together to the plasticizer gives better results than adding the aminated bentonite to premixed resin and plasticizer.

A second suitable gelling agent is silica aerogel. "Santocel" C was found to be effective in this invention. Aerogel's are gels from which the liquid phase has been removed without otherwise altering their structures. In the manufacture of "Santocel," silica hydrogel is dried without alteration of the solid structure. Air replaces the liquid removed, giving a structure much like that of an uncompressed sponge. From 3 to 8 parts by weight per one hundred parts resin of silica aerogel, have been used with 60 parts by weight of di(2-ethylhexyl)phthalate per hundred parts resin. Three parts per hundred produces soft molding compositions while 8 parts per hundred produces crumbly ones, and from 4 to 8 parts of silica aerogel per one hundred parts resin has been found preferable with 60 parts of plasticizer per hundred parts of resin. With a plasticizer content of 60 to 100 parts of plasticizer per hundred parts of resin, the preferred range of silica aerogel content is 4 to 12 parts by weight per hundred parts of resin. However, up to 50 parts of silica aerogel per hundred parts of resin are used with plasticizer contents ranging up to 300 parts per hundred parts resin. Silica aerogel has a slight stabilizing action and also gives films with better transparency than aminated bentonite. Increases in plasticizer concentration require increased concentrations of silica aerogel.

Aluminum soaps have also been found to have some usefulness as gelling agents. From 4 to 6 parts by weight per hundred parts resin of aluminum distearate are effective with 60 parts by weight of plasticizer per hundred parts resin, while 6 or more parts per hundred of aluminum monostearate are necessary. With plasticizer contents of from 60 to 100 parts by weight per 100 parts of resin, the preferred aluminum distearate content is from 6 to 12 parts per 100 parts resin by weight. In the broader plasticizer range of from 35 to 300 parts by weight per 100 parts resin, the aluminum distearate content varies from 3 to 40 parts by weight per 100 parts resin. Aluminum laurate and magnesium stearate can also be used.

In addition to the three basic ingredients of resin, plasticizer and gelling agent discussed above, various other materials may be added to the plastigel mixture for particular applications. These include fillers, stabilizers, pigments, thinners and others.

As shown in Example V, increasing the filler content increases the hardness after fusion, but lowers the tensile strength. Adding filler increases the rigidity or strength in compression and the consistency of the unfused mass. Some pigments and fillers, such as copper phthalocyanine pigment and finely divided silica filler, also exert a moderate thickening action themselves, and somewhat decrease the amount of gelling agent which must be added. The proper additions for particular plastigel products can be readily made by those familiar with plastics arts, and a number of such materials are listed in the examples.

Pigments are added to attain the color desired. Stabilizers can be added where necessary to retard decomposition of the resin at high temperatures. Thinners are important for coating compositions. When the plastigel mixture has been prepared and thoroughly mixed, it can then be shaped in a wide variety of ways prior to baking. The self-sustaining properties of plastigels make many methods of forming possible and quite easy and simple in operation and equipment required. A relatively high yield value of the shear stress of the unfused plastigel means that most molded objects will support their own weight during fusion with no other support. Only long appendages where the cantilever effects exceed the yield value of the shear stress require armatures or supports. The degree of spread of a standard cylinder of material under a given weight is a good measure of shear, and is discussed later. Another method is by using an extrusion rheometer.

Plastigels may be fabricated prior to fusion by many of the conventional methods of fabricating plastics but at much lower pressures and at room temperature, which permits the use of much simpler machinery and equipment. Plastigels are particularly well adapted to the extrusion process. The pressures required for the extrusion of plastigels are but a small fraction of those required for hot processing ordinary plastics. Die design is not difficult since, under the low pressure used, there is little distortion in the extruded shapes. High speeds can be achieved because the products have sufficient cohesion that they may be fused subsequent to the extrusion. Tubing and sheeting can be extruded and subsequently cured by festooning in an oven without measurable distortion. However, the preferred method is by extruding into a hot bath because of the supporting effect of the liquid and the faster heat transfer. Plastigel tubing can be made with a low pressure rubber extruder. Machinery designed for the extrusion of clay or ceramic products can be readily adapted to fabricating plastigels into pipe, tile and other similar products.

Unfused plastigels are easily embossed with low pressures at room temperature. In the laboratory, fabrics have been used to emboss sheets of plastigel at low pressures. Moisture on the fabric serves as an excellent release medium and imprints are maintained with good fidelity during the fusion process.

Calendering of plastigels under low pressure is possible for coating cloth, paper, felt and similar materials or for preparing unsupported sheets. The products may then be fused after application.

Molding and stamping are two more fabrication methods readily applicable to plastigels. Very fast cycles are possible since the objects merely need to be formed in a mold and may be fused in a subsequent operation outside the mold, releasing the mold to form a new part. The efficiency of plastigels in this regard is graphically illustrated from the fact that when a phonograph record was pressed from a plastigel and fused by baking outside the mold, a recognizable tune could be played from the finished record. Delicate inserts are not disturbed because only low pressures are required. Excess material squeezed from the mold may be reused because it has not been fused at this stage. Light weight molds can be employed and special platings or facings are unnecessary as room temperature processing prevents thermal degradation of the resin.

Hand molding of plastigels is a simple matter and offers wide possibilities. Plastigels for this purpose can be made in a wide range of colors and degrees of hardness. Plastigels reinforced with filler compounds such as whiting or finely divided silica have much the same working characteristics as ordinary modeling clay but with the advantage that they can be cured at temperatures available even in an ordinary domestic cooking oven.

Several miscellaneous fabrications with plastigels have already been found and proven. These include caulking compounds, tailor-made gaskets which may be fused in place, and potting compounds for protecting coils and intricate and delicate electrical connections. Flexibility and low shrinkage during curing are valuable properties in these types of applications.

Once the plastigel has been formed to the desired shape by some fabrication method such as those outlined above, a simple baking step is all that is necessary to produce the finished fused product. Plastigels require fusion at 300–400 deg. F. to obtain the maximum strength from the product. This is not a chemical reaction but is a mere solvation of the resin by the plasticizer. Therefore, the duration of the bake need only be long enough to permit heat transfer to the interior of the object. Various methods of heating may be used for the fusion.

Circulating air or infrared ovens are satisfactory for plastigels. Baths containing hot nonsolvent liquids are particularly useful for fusing extruded plastigels. Not only are baths convenient and rapid heat transfer media but the buoyant effect of the liquid permits the handling of plastigels too soft for baking in air. These baths may extract plasticizer from the product but this can be prevented by adding an equilibrium amount of plasticizer to the bath. An excess of plasticizer in the bath may cause adsorption of the plasticizer in the surface layers of plastigel. This may improve the surface gloss but sometimes develops surface tackiness.

In the examples which follow, a number of different tests were applied to the various compositions. Therefore, a detailed description of the various tests is given below.

To determine the resistance of a given molding composition to deformation from the heat of fusing, hand-molded figurines in the shape of miniature snowmen were used. These had a body or base a sphere approximately 20 cubic centimeters in volume and a spherical head about 10 cubic centimeters in volume. The arms of these miniature snowmen were cones attached by their bases to the outermost part of the body, with the axis of the cones horizontal. The base of each cone was approximately 1½ centimeters in diameter and the length of each cone was approximately 2½ centimeters. The figurine was placed on a glass plate with the base of the figurine having a flat spot to prevent tumbling. The figure and glass plate were placed in an oven at a temperature of 350° F. for 15 minutes, and then allowed to cool to room temperature. The arms were then examined for drooping, and details such as the fingerprints from the hand molding were noted.

The consistency test used was one evolved for measuring the consistency of putty by G. C. Sward and J. R. Stewart, "Putty Consistency," Scientific Section Circular No. 478 (March 1935), National Paint, Varnish and Lacquer Association, Inc., Washington, D. C. For this test, a 20 cubic centimeter volume of the material or composition to be tested is discharged by a piston from a hollow brass cylinder 3.4 centimeters in diameter. The resulting cylinder is then placed flat between two horizontal and parallel glass plates. A load of known weight is placed on the top plate of glass and removed after 60 seconds. The diameter of the deformed cylinder, as noted and measured, is a measure of the consistency of the material or composition. For comparison, results of this test as made by us on several compounds which are usually molded or pressed by hand are given below:

| Material | Diam. in cm. of Deformed Mass after Load of— | |
| --- | --- | --- |
| | 2,000 grams | 4,000 grams |
| Plumber's Putty (Dicks-Pontius Co.) | 7.9 | 9.2 |
| Plastic Wood (Boyle-Midway, Inc.) | 5.7 | 6.5 |
| Modeling Clay (Robin Hood Brand, Art Crayon Co., Inc.) | 3.5 | 3.9 |
| Dental Impression Compound at 47° C., (Lee S. Smith and Son Mfg. Co.) | 6.2 | 6.8 |

Another type of test, a centrifugal force test, was used to determine the resistance to flow of the various molding compositions. For this test, a pint can was affixed with its axis horizontal to a variable speed transmission. The inside diameter of the can was 8.25 centimeters. Spheres of molding composition weighing 2.0 grams were placed on the inside surface of the can. In the case of compositions too soft to be molded into spheres, 2.0 grams were placed in a lump or puddle by allowing the composition to drop from a spatula. The can was rotated at definite speed, such as to produce a centrifugal force of five times the pully of gravity, for 30 seconds, then removed and heated at a temperature of 350° for 15 minutes. A similar procedure was used with a force ten times the pull of gravity. After being allowed to cool naturally to room temperature, the fused sample of the composition was removed from the can and the maximum thickness in the direction of a radius of the can, from a wall toward the center of the can was measured. This thickness is a measure of the resistance to flow-out at the particular centrifugal force calculated at the inside surface of the can. Separate samples were used for each centrifugal force produced. It was noted that in none of the examples given below was any additional flow-out due to the heating observed. The symbol "G," as used in the centrifugal test data of the examples, denotes a force equal to the pull of gravity.

Example I

Using a laboratory pony mixer, a molding composition was made by mixing 100 parts by weight of an emulsion polymerized polyvinyl chloride resin, having a specific viscosity of 0.30, with 60 parts of a plasticizer, di(2-ethylhexyl)phthalate, and 5 parts of a gelling agent, aminated bentonite ("Bentone" 34). This molding composition was evaluated with an extrusion rheometer which showed that it had a finite value of shear stress and was a Bingham-type plastic. It had the moldable characteristics of putty and of modeling clay, although somewhat sticky.

A number of small figurines in the shape of miniature snowmen were molded by hand from the above composition and baked for 15 minutes in a circulating air oven at 350° F. During the heating period a yield value of shear stress was maintained and no sagging or flowing of the molded objects was detected. Upon cooling it was found that the molding composition, as formed into the figurines, had been converted to the fused state as flexible, elastomeric objects having a Shore Durometer A hardness of 85. No loss of detail in the molded objects had occurred during the fusing, with even the fingerprint impression from the hand-molding being discernible.

For comparison, a molding composition, differing from that above only in that no aminated bentonite was included, was made up. Figures molded from this composition flowed and formed a puddle on heating before they could be fused.

Example II

Three different molding compositions were mixed in a laboratory pony mixer at room temperature. All three contained 100 parts by weight of an emulsion polymerized polyvinyl chloride resin, having a specific viscosity of 0.30, 60 parts of di(2-ethylhexyl) phathalate, and aminated bentonite ("Bentone" 34) in the following proportions: Compound A, 4 parts by weight; compound B, 2 parts; and compound C, 1 part.

A consistency test, as previously described, was then made, using samples which had been aged 24 hours. For compound A, the result was 3.7 centimeters and for compound B, 9.7 centimeters. Centrifugal tests, as described previously were then made with 5 and 10 G forces. The thickness in inches for the three compounds were as follows: Compound A, using 5 G's, 0.570 and using 10 G's, 0.568; compound B, 0.455 and 0.415; and compound C, 0.390 and 0.285. Compounds A and B were molded into snowmen figurines and heated at 350° F. for 15 minutes, resulting in fusion. The baked figurines showed no evidence of sagging or distortion.

Composition C would not support its own weight in a 20 cubic centimeter cylinder and hence could not be given the consistency test or molded into a figurine. However, compound C did exhibit potentiality as a coating compound since in a thickness of 0.46 inch it did not flow at 350° F.

By comparison, a composition D was made up, similar to the three of the invention, but having only 0.5 part by weight of aminated bentonite. This composition was pourable and too fluid for a consistency test or for molding.

Example III

Three molding compositions were made up, each consisting of 100 parts by weight of an emulsion polymerized polyvinyl chloride resin, having a specific viscosity of 0.30, 60 parts by weight of a plasticizer, di(2-ethylhexyl)-phthalate, and 8 parts aminated bentonite ("Bentone" 34), but the aminated bentonite was added in a different manner in each of the three compositions.

Compound A was formulated by mixing all three components together at the same time, and the value for the consistency test was 6.7 centimeters. For compound B, the aminated bentonite was added to premixed resin and plasticizer and a value of 8.9 centimeters was obtained in the consistency test. For compound C, the 8 parts by weight of aminated bentonite were milled with 27.2 of the 60 parts by weight of di(2-ethylhexyl)phthalate on a laboratory three-roll paint mill. The resulting mixture, which resembled a grease, was then mixed with the resin and the rest of the 60 parts of plasticizer. This compound C had a consistency test value of 3.7 centimeters.

Compounds made by all three methods were molded into figurines and fused at temperatures of 350° F., the baked figurines showing no sagging or distortion of detail.

Example IV

Ten molding compositions were prepared by mixing the following ingredients in a laboratory pony mixer. Compounds B, C, E, F, G, H, and I were found suitable for extrusion; A, D, and J were unworkable in the extrusion process, though they could be shaped in other ways.

| | A | B | C | D | E | F | G | H | I | J |
|---|---|---|---|---|---|---|---|---|---|---|
| Material: | | | | | | | | | | |
| Emulsion polymerized polyvinyl chloride resin | 100 | 100 | 100 | 100 | 100 | 100 | 100 | 100 | 100 | 100 |
| Di (2-ethylhexyl) phthalate | 50 | 60 | 70 | 80 | 60 | 70 | 80 | 70 | 80 | 100 |
| Aminated bentonite ("Bentone" 34) | 5 | 5 | 5 | 5 | 10 | 10 | 10 | 20 | 20 | 20 |
| Dibasic lead phosphite [1] | 2 | 2 | 2 | 2 | 2 | 2 | 2 | 2 | 2 | 2 |
| Consistency Test Values: | | | | | | | | | | |
| (A) Specimens aged 24 hours. Diam. in cm. after 4,000 gram load | 3.5 | 6.6 | 11.0 | ------ | 3.5 | 3.8 | 7.0 | 3.5 | 3.5 | 3.9 |
| (B) Extruded specimens. Diam. in cm. after 4,000 gram load | 3.5 | 7.5 | ------ | ------ | 3.6 | 4.8 | 7.7 | 3.7 | 3.8 | 4.8 |

[1] Dibasic lead phosphite was present to stabilize the resin against decomposition due to heating.

The compositions were extruded into tubing ¼ inch outside diameter and ⅛ inch inside diameter, using a laboratory extruder. The second consistency test (B) above was made immediately after extrusion. The characteristics during extrusion were as follows:

Compound A was so stiff as to cause a heat build-up in the extruder to 126° F. with a consequent partial fusion and jamming of the extruder;

Compound B extruded very well;

Compound C extruded well, but was very soft, too soft for molding after extrusion;

Compound D was too soft to mold before extrusion and extrusion was not attempted;

Compound E extruded with some cracking due to the high concentration of aminated bentonite relative to the plasticizer content;

Compound F extruded well;

Compound G could be extruded, but the product was very soft;

Compound H and compound I both extruded as a very hard product due to the high concentration of aminated bentonite relative to the plasticizer content; and Compound J extruded well at first, but then overheated and extruded poorly.

All of the tubing, with the exception of that from compound D, which was not extruded, fused upon heating at a temperature of 350° F. for 15 minutes without collapse.

*Example V*

Four molding compositions were prepared by mixing at room temperature in a laboratory pony mixer, varying only in the amount of whiting added as a filler material to each. Each contained 50 parts by weight of an emulsion polymerized polyvinyl chloride resin, having a specific viscosity of 0.30; 50 parts by weight of an emulsion polymerized vinyl chloride-vinyl acetate copolymer resin consisting of 96 per cent vinyl chloride and having a specific viscosity of 0.29; 25 parts of di(2-ethylhexyl)phthalate and 25 parts tri(2-ethylhexyl)phosphate as plasticizers; 5 parts of aminated bentonite ("Bentone" 34), and whiting as a filler in varying proportions as shown in the table below. The table shows the results of consistency tests for each material.

Flat sheets approximately 0.15 inch thick by six inches square were pressed from each of the four compositions and were fused by baking for 15 minutes at 350° F. The Shore Durometer A hardness and the tensile strength for each of these compositions is shown in the table.

|  | A | B | C | D |
|---|---|---|---|---|
| Parts by weight of whiting added as a filler | 0 | 50 | 100 | 150 |
| Consistency test, diam. in centimeters: |  |  |  |  |
| after 2,000 gram load | 4.2 | 3.6 | 3.6 | 3.6 |
| after 4,000 gram load | 5.2 | 3.8 | 3.7 | 3.8 |
| Shore Durometer A hardness of sheet after fusing | 88 | 91 | 92 | 94 |
| Tensile strength, pounds per square inch of sheet after fusing | 268 | 241 | 183 | 162 |

*Example VI*

Two compositions were prepared by mixing the ingredients at room temperature in a laboratory pony mixer. Both contained 100 parts by weight of an emulsion polymerized polyvinyl chloride resin having a specific viscosity of 0.30, 60 parts of di(2-ethylhexyl)phthalate as a plasticizer, and 5 parts of aminated bentonite ("Bentone" 34) as a gelling agent. One compound contained, in addition to the above enumerated ingredients, 2 parts by weight of solution polymerized vinyl chloride-vinyl acetate copolymer resin consisting of 90 per cent vinyl chloride and having an intrinsic viscosity of 0.79 while the other contained none. The vinyl chloride-vinyl acetate resin was not mixed directly with the other ingredients, but was first dissolved in a portion of di(2-ethylhexyl)phthalate and then this mixture was blended with the other ingredients in the laboratory pony mixer.

The composition containing the additional dissolved resin has a tensile strength of 2135 pounds per square inch while the tensile strength of the other composition was 1634 pounds per square inch.

Both compositions of this example could be hand molded and were extruded by a laboratory extruder into tubing having a ¼ inch outside diameter and ⅛ inch inside diameter. The composition containing the dissolved resin was less prone to cracking when bent. After fusion by heating at 350° F. for 15 minutes the tubing extruded from the composition containing the dissolved resin had a higher tensile strength.

*Example VII*

A 25-pound mass of molding composition was made up by mixing together at room temperature in a "Lancaster Iron Works" putty chaser (a stone wheel rotating on a pan with plows preceding the wheel to throw material into the path of the wheel), 100 parts by weight of an emulsion polymerized polyvinyl chloride resin having a specific viscosity of 0.30, 60 parts of di(2-ethylhexyl)-phthalate, 2 parts of a solution polymerized vinyl chloride-vinyl acetate copolymer resin consisting of 90 per cent vinyl chloride and having an intrinsic viscosity of 0.79 which had been dissolved in a portion of the di(2-ethylhexyl)phthalate, 8 parts of aminated bentonite ("Bentone" 34), 27 parts of whiting, 15 parts of talc, 2 parts of dibasic lead phosphate, 3 parts titanium dioxide, and 20 parts of fibrous magnesium silicate.

This molding composition was then molded into a number of animal figures 6 to 8 inches tall. These were fused by heating at a temperature of 350° F. for 15 minutes in a standard-type kitchen oven and no distortion occurred. In modeling long appendages such as the neck of a miniature giraffe, it was found necessary to use wire armatures to overcome the cantilever beam effect which would have exceeded the yield value of the molding composition. Shorter appendages such as ears required no support.

Another portion of the same composition was extruded through a tubing die having an inside diameter of ⅛ inch and an outside diameter of ¼ inch into a bath of molten polyethylene glycol at a temperature of 350° F., fusing it. Lengths of tubing up to 30 feet were prepared in this manner. The tubing was flexible enough to be tied into knots and strong enough that several pounds of manual force were required to break it.

During the extrusion of some of the aforementioned tubing, copper wire 0.050 inch in diameter was inserted through the hollow mandrel of the extrusion die and the tubing and wire were pulled by hand at a rate fast enough for the tubing to neck down and encase the wire. The outside diameter of the wire coating was approximately ⅛ inch. The coated wire was heated at a temperature of 350° F. for 15 minutes in an oven without distortion or sagging of the coating and after cooling to room temperature it was found that the coating was tight against the wire. The wire and coating could be bent around a pencil to form a tight coil without rupture of the coating.

Still another portion of the molding composition was extruded through a slit 0.075 by 2 inches in a plate on a large kitchen-type meat grinder, forming a continuous ribbon which was fused by heating in a molten bath of polyethylene glycol (melting point −5° C.) in the same manner as the tubing mentioned above. Some of the ribbon was impressed momentarily with a figured cloth before fusion, the ribbon receiving the impression readily, and after fusion the design of the cloth remained on the surface of the ribbon.

*Example VIII*

A coating composition was prepared by milling together in a laboratory pony mixer 100 parts by weight of an emulsion polymerized polyvinyl chloride resin having a specific viscosity of 0.30, 53 parts di(2-ethylhexyl)-phthalate, 2 parts dibasic lead phosphite, 2 parts ground limestone, 10 parts fibrous magnesium silicate, 1.3 parts of a solution polymerized vinyl chloride-vinyl acetate copolymer having an intrinsic viscosity of 0.79 and containing 90% by weight of vinyl chloride, 1.9 parts copper phthalocyanine pigment, 5 parts aminated bentonite ("Bentone" 34), 10.6 parts xylene, and 26.6 parts naphthenic thinner.

The resulting composition was thin enough to be coated on cloth by a "Martinson" coater in a film approximately 10 mils thick. This type of coater comprises a flat horizontal platform which moves under a stationary coating blade. The coating was air dried for about one hour at room temperature. Examination of the coating before fusion showed that it had lost its free flowing characteristics and a portion of the coating scraped from the cloth could be molded into balls with the fingertips. A figured cloth was pressed against the coating and removed. The coating was then fused by heating at a temperature of 350° F. for 15 minutes and cooling the impression of the cloth was maintained on the coating.

After fusion, the coated cloth could be creased without cracking or peeling. A cantilever overhang of one inch sprang back to its original horizontal position after being bent down a full 90 degrees. The coating resisted fingernail scratching and adhered tightly to the cloth. The intaglio impression of the figured cloth against which it had been pressed was clearly defined in the coating.

Example IX

Six compositions using silica aerogel as a gelling agent were prepared by mixing in a laboratory pony mixer at room temperature the following ingredients, in the form indicated. Compositions A, B, D, and E illustrate the invention.

| | A | B | C | D | E | F |
|---|---|---|---|---|---|---|
| Material and Test Results: | | | | | | |
| Emulsion polymerized polyvinyl chloride resin | 100 | 100 | 100 | 100 | 100 | 100 |
| Di(2-ethylhexyl)phthalate | 60 | 60 | 60 | 60 | 60 | 60 |
| Silica aerogel ("Santocel" C) | | | | | | |
| added as dry powder | 8 | 6 | 4 | | | |
| added as a "grease" 1 | | | | 6 | 4 | 3 |
| Consistency test after 24 hours' aging, diameter in centimeters after 4,000 grams load | 3.5 | 4.1 | | 3.8 | 10.5 | |
| Centrifugal test, thickness in inches— | | | | | | |
| after 5 G's | | | 0.425 | | 0.495 | 0.300 |
| after 10 G's | 0.535 | 0.510 | 0.365 | 0.550 | 0.445 | 0.220 |

1 "Grease" formed by milling silica aerogel with di(2-ethylhexyl)phthalate on a three-roll mill in the ratio of one part silica aerogel to four parts di(2-ethylhexyl)phthalate.

Composition A was crumbly but could be hand molded after kneading. Composition B could be readily molded by hand, as could compositions D and E. Miniature snowman figurines molded from these four compositions fused at a temperature of 350° F. without distortion. However, compositions C and F, prepared in contrast to the compositions of the invention, were so liquid that they could not be molded into 20 cc. cylinders for consistency tests.

Example X

Two molding compositions were individually prepared on a laboratory pony mixer at room temperature. Compound A contained 100 parts by weight of a polymerized polyvinyl chloride resin having a specific viscosity of 0.30, 300 parts di(2-ethylhexyl)phthalate and 45 parts silica aerogel ("Santocel" C). Compound B contained 100 parts of a polymerized polyvinyl chloride resin having a specific viscosity of 0.30, 300 parts tricresyl phosphate and 50 parts silica aerogel.

After aging compound A 13 days and compound B 18 days, consistency tests were made, applying a load of 4000 gm. The values obtained were a 7.6 cm. diam. for compound A and a 6.4 cm. diam. for compound B. Both compositions were hand molded in the shape of miniature snowmen and then fused by heating at a temperature of 350° F. for 15 minutes. No distortion of the figurines was observed and the fingerprint impressions from the hand molding were discernible.

Example XI

A molding composition was prepared in the following manner. 6 parts of aluminum distearate were heated to 300° F. with 60 parts of di(2-ethylhexyl)phthalate and cooled with agitation. To this was added 100 parts of a polymerized polyvinyl chloride resin, having a specific viscosity of 0.30, using a laboratory pony mixer.

A consistency test was made of the composition using a 4000 gm. load. The result was a diameter of 6.6 cm. A miniature snowman was then hand-molded from the composition and was fused without deformation upon heating at a temperature of 350° F. for 15 minutes. Fingerprints from the hand-molding operation were still discernible after fusion.

Another molding composition, differing from the above only in that 4 parts of aluminum distearate were used instead of 6, was barely moldable. It was sticky and mild pressing with the fingers caused a thixotropic breakdown which further increased stickiness. Still another composition, employing 6 parts aluminum monostearate, was barely moldable.

Two other compositions were made up, by way of contrast, identical with the first in the example, except that they contained respectively 4 parts aluminum monostearate and 6 parts napalm, in place of the aluminum distearate of the first composition. Neither of these two latter compositions were moldable and neither would support its own weight in a 20 cc. cylinder.

What is claimed is:

1. A pasty to putty-like composition of matter characterized by its ability to be readily formed at room temperature to any desired shape and to then be converted by heating to an elastomeric composition retentive of said shape, said composition of matter comprising 100 parts by weight of discrete particles of an emulsion-polymerized vinyl chloride polymer resin containing a predominant amount of polymerized vinyl chloride, dispersed in from 35 to 300 parts by weight of a high boiling point liquid plasticizer in which said emulsion-polymerized vinyl chloride polymer resin is insoluble except at elevated temperatures, the character of said dispersion being modified from its normally fluid consistency to a thixotropic, pasty to putty-like composition by the addition of at least one organophilic gelling agent selected from the group consisting of an amine adduct of bentonite, a silica aerogel and aluminum di-stearate, the proportion of the amine adduct of bentonite being from 2 to 50 parts by weight, of silica aerogel from 3 to 50 parts by weight, and of aluminum di-stearate from 3 to 40 parts by weight.

2. A pasty to putty-like composition of matter characterized by its ability to be readily formed at room temperature to any desired shape and to then be converted by heating to an elastomeric composition retentive of said shape, said composition of matter comprising 100 parts by weight of discrete particles of an emulsion-polymerized vinyl chloride polymer resin containing a predominant amount of polymerized vinyl chloride, dispersed in from 60 to 100 parts by weight of a high boiling point liquid plasticizer in which said emulsion-polymerized vinyl chloride polymer resin is insoluble except at elevated temperatures, the character of said dispersion being modified from its normally fluid consistency to a thixotropic, pasty to putty-like composition by the addition of at least one organophilic gelling agent selected from the group consisting of an amine adduct of bentonite, a silica aerogel and aluminum di-stearate, the proportion of the amine adduct of bentonite being from 2 to 50 parts by weight, of silica aerogel from 3 to 50 parts by weight, and of aluminum di-stearate from 3 to 40 parts by weight.

3. A pasty to putty-like composition of matter characterized by its ability to be readily formed at room temperature to any desired shape and to then be converted by heating to an elastomeric composition retentive of said shape, said composition of matter comprising 100 parts by weight of discrete particles of an emulsion-polymerized vinyl chloride polymer resin containing a predominant amount of polymerized vinyl chloride, dispersed in from 60 to 100 parts by weight of a high boiling point liquid plasticizer in which said emulsion-polymerized vinyl chloride polymer resin is insoluble except at elevated temperatures, the character of said dispersion being modified from its normally fluid consistency to a thixotropic, pasty to putty-like composition by the addition of at least one organophilic gelling agent selected from the group consisting of an amine adduct of bentonite, a silica aerogel and aluminum di-stearate, the proportion of the amine adduct of bentonite being from 2 to 10 parts by weight, of silica aerogel from 4 to 10 parts by weight, and of aluminum di-stearate from 6 to 12 parts by weight.

4. A pasty to putty-like composition of matter characterized by its ability to be readily formed at room temperature to any desired shape and to then be converted by heating to an elastomeric composition retentive of said shape, said composition of matter comprising 100 parts by weight of discrete particles of an emulsion-polymerized polyvinyl chloride polymer resin containing a predominant amount of polymerized vinyl chloride dispersed in from 35 to 300 parts by weight of a high boiling point liquid plasticizer in which said emulsion-polymerized vinyl chloride resin is insoluble except at elevated temperatures, the character of said dispersion being modified from its normally fluid consistency to a thixotropic, pasty to putty-like composition by the addition of at least one organophilic gelling agent selected from the group consisting of an amine adduct of bentonite, a silica aerogel and aluminum di-stearate, the proportion of the amine adduct of bentonite being from 2 to 50 parts by weight, of silica aerogel from 3 to 50 parts by weight, and of aluminum di-stearate from 3 to 40 parts by weight, and said mixture comprising additionally from 0 to 5 parts by weight of a solution polymerized vinyl chloride-vinyl acetate copolymer resin which has been previously dissolved in a portion of said plasticizer, from 0 to 300 parts by weight of a filler, from 0 to 10 parts by weight of a stabilizer, and from 0 to 50 parts by weight of a pigment.

5. A pasty to putty-like composition of matter characterized by its ability to be readily formed at room temperature to any desired shape and to then be converted by heating to an elastomeric composition retentive of said shape, said composition of matter comprising 100 parts by weight of discrete particles of an emulsion-polymerized vinyl chloride polymer resin containing a predominant amount of polymerized vinyl chloride, dispersed in from 35 to 300 parts by weight of a high boiling point liquid plasticizer in which said emulsion-polymerized vinyl chloride polymer resin is insoluble except at elevated temperatures, the character of said dispersion being modified from its normally fluid consistency to a thixotropic, pasty to putty-like composition by the addition of at least one organophilic gelling agent selected from the group consisting of an amine adduct of bentonite, a silica aerogel and aluminum di-stearate, the proportion of the amine adduct of bentonite being from 2 to 50 parts by weight, of silica aerogel from 3 to 50 parts by weight, and of aluminum di-stearate from 3 to 40 parts by weight, and said mixture comprising additionally from 0 to 5 parts by weight of butyl methacrylate which has been previously dissolved in a portion of said plasticizer, from 0 to 300 parts by weight of a filler, from 0 to 10 parts by weight of a stabilizer and from 0 to 50 parts by weight of a pigment.

6. A pasty composition of matter adapted for use as a coating composition and characterized by its ability to receive an impression at room temperature and to then be converted by heating to a fused coating retentive of said impression, said composition of matter comprising 100 parts by weight of discrete particles of an emulsion-polymerized vinyl chloride polymer resin, containing a predominant amount of polymerized vinyl chloride, dispersed in from 35 to 300 parts by weight of a plasticizer in which said emulsion-polymerized vinyl chloride polymer resin is insoluble except at elevated temperatures, the character of said dispersion being modified from its normally fluid consistency to a thixotropic, pasty composition by the addition of at least one organophilic gelling agent selected from the group consisting of an amine adduct of bentonite, a silica aerogel and aluminum di-stearate, the proportion of the amine adduct of bentonite being from 2 to 50 parts by weight, of silica aerogel from 3 to 50 parts by weight, and of aluminum di-stearate from 3 to 40 parts by weight, and said mixture comprising additionally from 5 to 150 parts by weight of a volatile, non-solvent thinner, from 0 to 300 parts by weight of a filler, from 0 to 10 parts by weight of a stabilizer and 0 to 50 parts by weight of a pigment.

7. A pasty to putty-like composition of matter characterized by its ability to be readily formed at room temperature to any desired shape and to then be converted by heating to an elastomeric composition retentive of said shape, said composition comprising 100 parts by weight of discrete particles of an emulsion-polymerized vinyl chloride polymer resin, containing a predominant amount of polymerized vinyl chloride, dispersed in from 35 to 300 parts by weight of a plasticizer in which said emulsion-polymerized vinyl chloride polymer resin is insoluble except at elevated temperatures, the character of said dispersion being modified from its normally fluid consistency to a thixotropic, pasty to putty-like composition by the addition of from 2 to 50 parts by weight of an amine adduct of bentonite as a gelling agent.

8. A pasty to putty-like composition of matter characterized by its ability to be readily formed at room temperature to any desired shape and to then be converted by heating to an elastomeric composition retentive of said shape, said composition comprising 100 parts by weight of discrete particles of an emulsion-polymerized vinyl chloride polymer resin, containing a predominant amount of polymerized vinyl chloride, dispersed in from 60 to 100 parts by weight of a plasticizer in which said emulsion-polymerized vinyl chloride polymer resin is insoluble except at elevated temperatures, the character of said dispersion being modified from its normally fluid consistency to a thixotropic, pasty to putty-like composition by the addition of from 2 to 50 parts by weight of an amine adduct of bentonite as a gelling agent.

9. A pasty to putty-like composition of matter characterized by its ability to be readily formed at room temperature to any desired shape and to then be converted by heating to an elastomeric composition retentive of said shape, said composition comprising 100 parts by weight of discrete particles of an emulsion-polymerized vinyl chloride polymer resin, containing a predominant amount of polymerized vinyl chloride, dispersed in from 60 to 100 parts by weight of a plasticizer in which said emulsion-polymerized vinyl chloride polymer resin is insoluble except at elevated temperatures, the character of said dispersion being modified from its normally fluid consistency to a thixotropic, pasty to putty-like composition by the addition of from 4 to 12 parts by weight of an amine adduct of bentonite as a gelling agent.

10. A pasty to putty-like composition of matter characterized by its ability to be readily formed at room temperature to any desired shape and to then be converted by heating to an elastomeric composition retentive of said shape, said composition comprising 100 parts by weight of discrete particles of an emulsion-polymerized vinyl chloride polymer resin, containing a predominant amount of polymerized vinyl chloride, dispersed in from 35 to 300 parts by weight of a plasticizer in which said emulsion-polymerized vinyl chloride polymer resin is insoluble except at elevated temperatures, the character of said dispersion being modified from its normally fluid consistency to a thixotropic, pasty to putty-like composition by the addition of from 3 to 50 parts by weight of a silica aerogel as a gelling agent.

11. A pasty to putty-like composition of matter characterized by its ability to be readily formed at room temperature to any desired shape and to then be converted by heating to an elastomeric composition retentive of said shape, said composition comprising 100 parts by weight of discrete particles of an emulsion-polymerized vinyl chloride polymer resin, containing a predominant amount of polymerized vinyl chloride, dispersed in from 60 to 100 parts by weight of a plasticizer in which said emulsion-polymerized vinyl chloride polymer resin is insoluble except at elevated temperatures, the character of said dispersion being modified from its normally fluid consistency to a thixotropic, pasty to putty-like composition by the addition of from 3 to 50 parts by weight of a silica aerogel as a gelling agent.

12. A pasty to putty-like composition of matter characterized by its ability to be readily formed at room temperature to any desired shape and to then be converted by heating to an elastomeric composition retentive of said shape, said composition comprising 100 parts by weight of discrete particles of an emulsion-polymerized vinyl chloride polymer resin, containing a predominant amount of polymerized vinyl chloride, dispersed in from 60 to 100 parts by weight of a plasticizer in which said emulsion-polymerized vinyl chloride polymer resin is insoluble except at elevated temperatures, the character of said dispersion being modified from its normally fluid consistency to a thixotropic, pasty to putty-like composition by the addition of from 4 to 10 parts by weight of a silica aerogel as a gelling agent.

13. A pasty to putty-like composition of matter characterized by its ability to be readily formed at room temperature to any desired shape and to then be converted by heating to an elastomeric composition retentive of said shape, said composition comprising 100 parts by weight of discrete particles of an emulsion-polymerized vinyl chloride polymer resin, containing a predominant amount of polymerized vinyl chloride, dispersed in from 35 to 300 parts by weight of a plasticizer in which said emulsion-polymerized vinyl chloride polymer resin is insoluble except at elevated temperatures, the character of said dispersion being modified from its normally fluid consistency to a thixotropic, pasty to putty-like composition by the addition of from 3 to 40 parts by weight of an aluminum di-stearate as a gelling agent.

14. A pasty to putty-like composition of matter characterized by its ability to be readily formed at room temperature to any desired shape and to then be converted by heating to an elastomeric composition retentive of said shape, said composition comprising 100 parts by weight of discrete particles of an emulsion-polymerized vinyl chloride polymer resin, containing a predominant amount of polymerized vinyl chloride, dispersed in from 60 to 100 parts by weight of a plasticizer in which said emulsion-polymerized vinyl chloride polymer resin is insoluble except at elevated temperatures, the character of said dispersion being modified from its normally fluid consistency to a thixotropic, pasty to putty-like composition by the addition of from 3 to 40 parts by weight of an aluminum di-stearate as a gelling agent.

15. A pasty to putty-like composition of matter characterized by its ability to be readily formed at room temperature to any desired shape and to then be converted by heating to an elastomeric composition retentive of said shape, said composition comprising 100 parts by weight of discrete particles of an emulsion-polymerized vinyl chloride polymer resin, containing a predominant amount of polymerized vinyl chloride, dispersed in from 60 to 100 parts by weight of a plasticizer in which said emulsion-polymerized vinyl chloride polymer resin is insoluble except at elevated temperatures, the character of said dispersion being modified from its normally fluid consistency to a thixotropic, pasty to putty-like composition by the addition of from 6 to 12 parts by weight of an aluminum di-stearate as a gelling agent.

16. A process for producing a fused plastic product having a Shore Durometer A hardness of from 15 to 95 which comprises making a mixture readily shapeable at a temperature below its fusion temperature by dispersing 100 parts by weight of an emulsion-polymerized vinyl chloride polymer resin containing a predominant amount of polymerized vinyl chloride, in from 35 to 300 parts by weight of a plasticizer in which said vinyl chloride polymer resin is insoluble except at elevated temperatures, adding with mixing thereto at least one organophilic gelling agent from the group consisting of an amine adduct of bentonite, a silica aerogel and aluminum di-stearate, the proportion of the amine product of bentonite being from 2 to 50 parts by weight, of silica aerogel from 3 to 50 parts by weight and of aluminum di-stearate from 3 to 40 parts by weight, the foregoing steps of producing said mixture all being carried out at a temperature below the fusion temperature of the resin and the plasticizer shaping said mixture at a temperature below said fusion temperature, heating said shaped mixture at a temperature of between 300 and 400° F. for from 5 to 30 minutes, to dissolve said vinyl chloride polymer resin in said plasticizer and produce a fused object, and then cooling said fused object down to room temperature.

17. A process for producing a fused plastic product having a Shore Durometer A hardness of from 15 to 95 which comprises making a mixture readily shapeable at a temperature below its fusion temperature by dispersing 100 parts by weight of an emulsion-polymerized vinyl chloride polymer resin containing a predominant amount of polymerized vinyl chloride, in from 60 to 100 parts by weight of a plasticizer in which said vinyl chloride polymer resin is insoluble except at elevated temperatures, adding with mixing thereto at least one organophilic gelling agent from the group consisting of an amine adduct of bentonite, a silica aerogel and aluminum di-stearate, the proportion of the amine adduct of bentonite being from 2 to 50 parts by weight, of silica aerogel from 3 to 50 parts by weight and of aluminum di-stearate from 3 to 40 parts by weight, the foregoing steps of producing said mixture all being carried out at a temperature below the fusion temperature of the resin and the plasticizer shaping said mixture at a temperature below said fusion temperature, heating said shaped mixture at a temperature of between 300 and 400° F. for from 5 to 30 minutes, to dissolve said vinyl chloride polymer resin in said plasticizer and produce a fused object, and then cooling said fused object down to room temperature.

18. A process for producing a fused plastic product having a Shore Durometer A hardness of from 15 to 95 which comprises making a mixture readily shapeable at a temperature below its fusion temperature by dispersing 100 parts by weight of an emulsion-polymerized vinyl chloride polymer resin containing a predominant amount of polymerized vinyl chloride, in from 60 to 100 parts by weight of a plasticizer in which said vinyl chloride polymer resin is insoluble except at elevated temperatures, adding with mixing thereto at least one organophilic gelling agent from the group consisting of an amine adduct of bentonite, a silica aerogel and aluminum di-stearate, the proportion of the amine adduct of bentonite being from 4 to 12 parts by weight, of silica aerogel from 4 to 10 parts by weight and of aluminum di-stearate from 6 to 12 parts by weight, the foregoing steps of producing said mixture all being carried out at a temperature below the fusion temperature of the resin and the plasticizer shaping said mixture at a temperature below said fusion temperature, heating said shaped mixture at a temperature of between 300 and 400° F. for from 5 to 30 minutes, to dissolve said vinyl chloride polymer resin in said plasticizer and produce a fused object, and then cooling said fused object down to room temperature.

19. A process for producing a fused plastic product having a Shore Durometer A hardness of from 15 to 95 which comprises making a mixture readily shapeable at a temperature below its fusion temperature by dispersing 100 parts by weight of an emulsion-polymerized vinyl chloride polymer resin containing a predominant amount of polymerized vinyl chloride, in from 35 to 300 parts by weight of a plasticizer containing from 0 to 5 parts by weight of a solution polymerized vinyl chloride-vinyl acetate copolymer resin dissolved in a portion of said plasticizer, said emulsion-polymerized vinyl chloride polymer resin being insoluble in said plasticizer except at elevated temperatures, then adding from 0 to 300 parts by weight of a filler, from 0 to 10 parts by weight of a stabilizer, from 0 to 50 parts by weight of a pigment, adding with mixing thereto at least one gelling agent from the group consisting of an amine adduct of bentonite, a silica aerogel and aluminum di-stearate, the proportion of the amine adduct of bentonite being from 2 to 50 parts by weight, of silica aerogel from 3 to 50 parts by weight and of aluminum di-stearate from 3 to 40 parts by weight, the foregoing steps of producing said mixture all being carried out at a temperature below the fusion temperature of the resin and the plasticizer shaping said mixture in the desired manner at a temperature below said fusion temperature, heating said shaped mixture at a temperature of between 300 and 400° F. for from 5 to 30 minutes, to dissolve said emulsion-polymerized vinyl chloride polymer resin in said plasticizer and produce a fused object, and then cooling said fused object down to room temperature.

20. A process for producing a fused plastic product having a Shore Durometer A hardness of from 15 to 95 which comprises making a mixture readily shapeable at a temperature below its fusion temperature by dispersing 100 parts by weight of an emulsion-polymerized vinyl chloride polymer resin containing a predominant amount of polymerized vinyl chloride, in from 35 to 300 parts by weight of a plasticizer containing from 0 to 5 parts by weight of butylmethacrylate dissolved in a portion of said plasticizer, said emulsion-polymerized vinyl chloride polymer resin being insoluble in said plasticizer except at elevated temperatures, then adding from 0 to 300 parts by weight of a filler, from 0 to 10 parts by weight of a stabilizer, from 0 to 50 parts by weight of a pigment, adding with mixing thereto at least one gelling agent from the group consisting of an amine adduct of bentonite, a silica aerogel and aluminum di-stearate, the proportion of the amine adduct of bentonite being from 2 to 50 parts by weight, of silica aerogel from 3 to 50 parts by weight and of aluminum di-stearate from 3 to 40 parts by weight, the foregoing steps of producing said mixture all being carried out at a temperature below the fusion temperature of the resin and the plasticizer shaping said mixture in the desired manner at a temperature below said fusion temperature, heating said shaped mixture at a temperature of between 300 and 400° F. for from 5 to 30 minutes, to dissolve said emulsion-polymerized vinyl chloride polymer resin in said plasticizer and produce a fused object, and then cooling said fused object down to room temperature.

References Cited in the file of this patent

UNITED STATES PATENTS 2,397,751   Rand _____ Apr. 2, 1946
2,676,943   Carson _____ Apr. 27, 1954

OTHER REFERENCES

Modern Plastics, vol. 29, January 1952, pages 99–101.